United States Patent
Shimosaka et al.

(10) Patent No.: US 6,914,023 B2
(45) Date of Patent: Jul. 5, 2005

(54) SUBSTRATE FOR FLAT PANEL DISPLAY AND THIN FILM ELECTROLUMINECENCE ELEMENT

(75) Inventors: Takaji Shimosaka, Shirai (JP); Yukihiko Shirakawa, Tokyo (JP); Shirou Ootsuki, Tokyo (JP)

(73) Assignee: TDK Corporation, Tokyo (JP)

( * ) Notice: Subject to any disclaimer, the term of this patent is extended or adjusted under 35 U.S.C. 154(b) by 181 days.

(21) Appl. No.: 10/619,458

(22) Filed: Jul. 16, 2003

(65) Prior Publication Data

US 2004/0138042 A1 Jul. 15, 2004

(30) Foreign Application Priority Data

Jul. 16, 2002 (JP) ........................................ 2002-207057

(51) Int. Cl.[7] ..................... B32B 17/06; C03C 10/04; C03C 14/00
(52) U.S. Cl. ................. 501/32; 501/5; 501/8; 501/9; 313/503
(58) Field of Search ................. 501/5–10, 32; 313/503

(56) References Cited

U.S. PATENT DOCUMENTS

| | | | | |
|---|---|---|---|---|
| 5,459,109 A | | 10/1995 | Lapp | 501/66 |
| 5,741,746 A | * | 4/1998 | Kohli et al. | 501/70 |
| 5,968,857 A | * | 10/1999 | Pinckney | 501/10 |
| 6,248,678 B1 | * | 6/2001 | Pinckney | 501/10 |

FOREIGN PATENT DOCUMENTS

| | | |
|---|---|---|
| EP | 0 729 922 A1 | 9/1996 |
| JP | A 58-29880 | 2/1983 |
| JP | A 63-50345 | 3/1988 |
| JP | A 63-307141 | 12/1988 |
| JP | A 6-16454 | 1/1994 |
| JP | B2 7-44072 | 5/1995 |
| JP | A 10-70214 | 3/1998 |
| JP | A 11-135899 | 5/1999 |
| JP | A 2000-72472 | 3/2000 |
| JP | A 2000-303878 | 10/2000 |
| JP | A 2001-196185 | 7/2001 |
| JP | A 2001-319774 | 11/2001 |

OTHER PUBLICATIONS

Shosaku Tanaka; "The technology trend of recent displays"; Monthly Magazine Display; Apr. 1998; pp 1–10 w/ transl.

X. Wu; "Multicolor Thin–Film Ceramic Hybrid EL Displays"; IDW (International Display Workshop); 1997; pp 593–596.

* cited by examiner

Primary Examiner—Karl Group
(74) Attorney, Agent, or Firm—Oliff & Berridge, PLC (57) ABSTRACT

The object of the present invention is to provide a flat-panel-display substrate which is high in heat resistance, of which the coefficient of thermal expansion is approximated to that of a thick film dielectric layer, which is low at high temperatures in reactivity with the lead-doped thick film dielectric layer, and which can be made to have a large area. The substrate of the present invention is obtained by sintering a body comprising glass powder and a filler made of metal and/or semi-metal oxide, and is constituted by the sintered body and whose average coefficient of linear thermal expansion is from 7 to 9.5 ppm/° C. in the temperature range of 25 to 700° C. The glass powder includes alkaline-earth oxide, 15 to 50% by weight of silicon oxide, and no greater than 2% by weight of boron oxide. Furthermore, the filler is at a concentration of 10 to 30% by volume of the total amount of the glass powder and the filler in the mould.

8 Claims, 2 Drawing Sheets

SUBSTRATE FOR FLAT PANEL DISPLAY AND THIN FILM ELECTROLUMINECENCE ELEMENT

BACKGROUND OF THE INVENTION

1. Field of the Invention

The present invention relates to a substrate for a flat panel display and an electroluminecence element using the substrate.

2. Related Background Art

Electroluminecence elements are practically used as a liquid crystal display (LCD) and a back light for a clock.

Electroluminecence elements are elements using an emitting-light phenomenon of materials when a voltage is applied, that is, an electroluminecence (EL) phenomenon.

There are two types of electroluminecence elements using a fluorescent body made of an inorganic material; one is a dispersed-type electroluminecence element having a structure where electrode layers are provided on the top and bottom of a light emission layer formed by an organic substance or vitreous enamel having levigated fluorescent material dispersed therein, and the other is a type of thin film electroluminecence element that has a laminated body having a structure where a thin film light emission body is sandwiched by a pair of thin film insulators and further by a pair of electrode layers, provided on an electrically-insulating substrate.

Furthermore, each of the types has a direct-current voltage driving type and an alternating voltage driving type. The dispersed-type electroluminecence element has been known long before, and has an advantage of being easy to produce, but the use thereof is limited because the illuminance is low and the life time is short. On the other hand, the thin film electroluminecence element has been widely used in recent years because it has characteristics of high illuminance and long lifetime.

Figure 2:
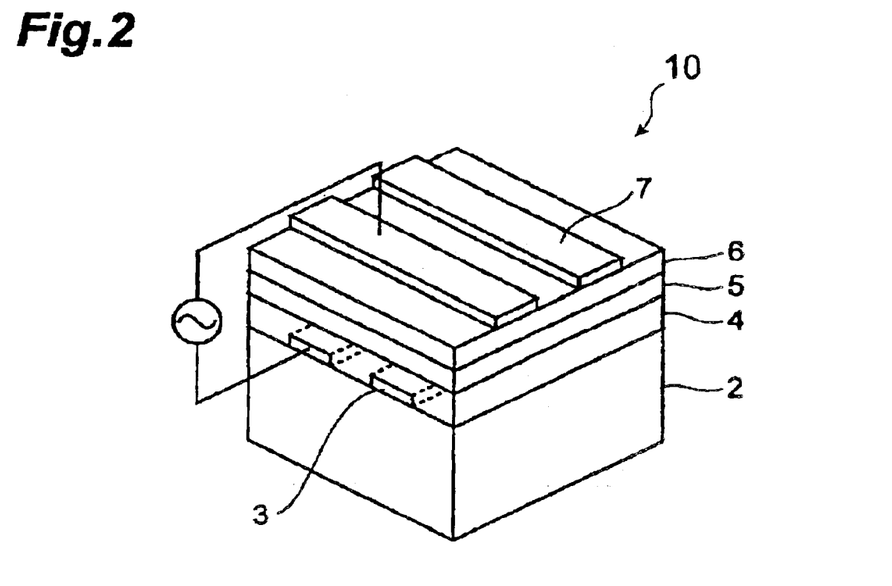
FIG. 2 is an oblique perspective view schematically showing the structure of a typical double-insulating-type thin film EL element as a conventional EL element.

FIG. 2 is an oblique, perspective view showing schematically the structure of a typical double-insulating-type thin film EL element as a conventional EL element. This thin film EL element 10 has a structure where a lower electrode layer 3, a lower insulator layer 4, a light emission layer 5, an upper insulator layer 6, and an upper electrode layer 7 are overlaid in that order on an electrically-insulating substrate 2.

The substrate 2 is transparent, and constituted by a blue glass plate used for a liquid crystal display, a PDP, etc. The lower electrode layer 3 is formed of ITO (Indium Tin Oxide) having a film thickness of about 0.2 to 1 $\mu$m. The lower insulator layer 4 and the upper insulator layer 6 are respectively a thin film having a thickness of about 0.1 to 1 $\mu$m and formed by sputtering or vapor deposition, and are made of $Y_2O_3$, $Ta_2O_5$, $Ai_3N_4$, $BaTiO_3$, or the like.

The light emission layer 5 has a film thickness of about 0.2 to 1 $\mu$m. The upper electrode layer 7 is made of metal such as Al The lower electrode layer 3 and the upper electrode layer 7 are so patterned like stripes that one of them is a row electrode and the other is a column electrode, the stripes being arranged orthogonal to each other. The intersections of the row electrode and the column electrode form picture elements, and by selectively applying an alternating voltage or a pulse voltage to a specific picture element via this matrix pair of the electrodes, the light emission body is made to emit light, and the emitted light is produced from the substrate 2 side.

The lower insulator layer 4 and the upper insulator layer 6 of this thin film EL element 10 have a function to limit an electric current flowing through the light emission layer 5, thereby preventing the dielectric breakdown of the thin film EL element and functioning to achieve a stable light emission characteristic. Because of this function, the thin film EL element 10 having this structure is widely in practical use commercially as well.

As the fluorescent material forming the light emission layer 5, ZnS in which Mn emitting yellowish orange light is doped has been mainly used from the point of view of easiness in forming a film and light emission characteristics. In order to make a color display, it is inevitable to adopt light emission materials that emit three primary colors of red, green, and blue.

Known as these materials are SrS with Ce doped or ZnS with Tm doped for emitting blue light, ZnS with Sm doped or CaS with Eu doped for emitting red light, and ZnS with Tb doped or CaS with Ce doped for emitting green light.

Disclosed in a literature, Shosaku Tanaka, "The technology trend of recent displays", Monthly Magazine Display, April 1998, pp. 1–10 are ZnS, Mn/CdSSe, etc., as materials for red light emission; ZnS:TbOF, ZnS:Tb, etc., as materials for green light emission; and SrS:Cr, (SrS:Ce/ZnS)n, $CaGa_2S_4$:Ce, $SrGa_2S_4$:Ce, etc., as materials for blue light emission. Furthermore, SrS:Ce/ZnS:Mn, etc., are disclosed as materials for white light emission.

In addition, SrS:Ce from among the above materials being used as the blue light emission layer of the thin film EL element 10 is disclosed in a literature, X. Wu, "Multicolor Thin-Film Ceramic Hybrid EL Displays", IDW (International Display Workshop), 1997, pp. 593–596. It is also disclosed in this literature that forming a light emission layer of SrS:Ce in the $H_2S$ atmosphere by an electron beam vapor deposition method can produce a light emission layer with high purity.

However, there is still a problem in terms of structure with this thin film EL element 10, which has to be solved. That is, when displays having a large area are produced, the problem is that the light emission layer 5 may break down due to a local decrease of the insulation-withstand voltage at the steps at the pattern's edge of the lower electrode layer 3 in the lower insulator layer 4, which is a thin film, or defects in the lower insulator layer 4 caused by dust, etc., generated in the production process, which defects are difficult to eliminate.

Because the problem is fatal to display devices, there has been a bigger obstacle to the thin film EL element being widely used as a display having a large area compared with a liquid crystal display or a plasma display.

Disclosed in Japanese Patent Publication No. 7-44072 is an EL element using a electrically-insulating ceramic substrate as the substrate 2 and a thick film dielectric layer instead of the thin film insulator layer as the lower insulator layer 4 in order to solve the problem that defects are easy to occur in the insulator layer, which is a thin film. The EL element disclosed in the literature is different in structure from the conventional thin film EL element in that, in order to produce light emitted by the light emission layer 5 from the opposite side from the substrate 2, the upper electrode layer 7 is a transparent electrode layer.

The thick film dielectric layer is formed to have a thickness of several tens to several hundreds $\mu$m, which is several hundreds to several thousands times that of the thin film insulator layer. Therefore, the number of the occurrences of dielectric breakdown due to the steps formed by the lower electrode layer 3 or pinholes formed by dust, etc., in the production process is reduced greatly, and thus it has an advantage that high reliability and high yield in the production are obtained.

Note that although using the thick film dielectric layer poses a problem that an effective voltage applied to the light emission layer 5 decreases, this problem is overcome in for example Japanese Patent Publication No. 7-44072 by forming the thick film dielectric layer of a compound-perovskite high dielectric material including lead.

As described above, by using the thick film dielectric layer having a high dielectric constant, the problem can be solved that breakdown in the light emission layer may be caused by a local decrease of the insulation-withstand voltage at the steps at the pattern edge or defects in the insulator layer caused by dust, etc., occurring in the production process, which problem is likely to occur in the case of the thin film insulator layer.

However, in forming a thick film dielectric layer, it is necessary to coat or deposit a dielectric green over a substrate by use of a screen print, a green sheet method, or the like and then sinter it at a high temperature of 700 to 800° C. or above. Accordingly, a material forming the substrate needs to have an enough mechanical heat resistance at that temperature and a coefficient of thermal expansion that coincides with that of the formed thick film dielectric layer, and needs to be low in reactivity with the thick film dielectric material. Therefore, in the prior art, an alumina ceramic substrate has been mainly used as the substrate.

SUMMARY OF THE INVENTION

However, because the alumina ceramic substrate needs to be sintered at a high temperature of 1400 to 1600° C. or above in the production process, it costs too much, and further it is difficult to make a flat substrate having a large area. It is very difficult to make a flat substrate having no warp and undulation when the substrate has a large area of several tens square centimeters or greater. In addition, although mechanical polishing is applicable to improve the flatness of the substrate, alumina is hard to mechanically polish to be flat because it is mechanically very rigid, and therefore the cost is high.

Further, although a high-distortion-point glass developed for a plasma display panel (PDP) substrate exists as a large scale substrate, the upper limit of the high-distortion-point glass's heat resistance is at a temperature of about 600 to 620° C., so that heat process at a temperature higher than this causes much thermal deformation and thus it is difficult to use it for the thin film EL element having the thick film dielectric layer.

Because of these problems, in the prior art, it is difficult to produce EL displays having an area of 5 inches or greater at low cost.

The present invention was made under such circumstances, and the object is to provide a flat-panel-display substrate and a thin film EL element using the same, which substrate is high in heat resistance, of which the coefficient of thermal expansion is approximated to that of the thick film dielectric layer, which is low at high temperatures in reactivity with the lead-doped thick film dielectric layer, and which can be made to have a large area.

In order to solve the above problems, the a flat-panel-display substrate is constituted by a body comprising glass powder including alkaline-earth oxide, 15 to 50% by weight of silicon oxide and less than 2% by weight of boron oxide; and a filler made of metal oxide and/or semi-metal oxide, which body has been sintered to form the substrate. In the mould, the filler is at a concentration of 10 to 30% by volume of the total amount of the glass powder and the filler; the mould's average coefficient of linear thermal expansion is from 7 to 9.5 ppm/° C. in the temperature range of 25 to 700° C., and the mould is constituted by a sintered body including crystal phases.

Note that preferably the glass powder does not substantially include boron oxide, that is, boron oxide is at a concentration of 0% by weight.

Further, preferably the glass powder includes alkaline-earth oxide at a concentration of 35 to 55% by weight.

Yet further, preferably the glass powder does not substantially include alkali-metal oxide and phosphorous oxide, and if any, alkali-metal oxide and phosphorous oxide are respectively at a concentration of less than 1% by weight.

In addition, it is more preferable that the glass powder includes as essential components silicon oxide at a concentration of 25 to 50% by weight, aluminum oxide at a concentration of 5 to 15% by weight, and titanium oxide and/or zirconium oxide at a concentration of 5 to 30% by weight, and as optional components barium oxide at a concentration of 0.45% or less by weight, strontium oxide at a concentration of 45% or less by weight, calcium oxide at a concentration of 15% or less by weight, and magnesium oxide at a concentration of 15% or less by weight.

Note that the optional components, barium oxide, strontium oxide, calcium oxide, and magnesium oxide are preferably present in the glass powder.

In addition, it is more preferable that the filler includes at least one of alumina, forsterite, and zirconium.

Specifically, the flat-panel-display substrate according to the present invention is advantageous when used for a thin film EL element or a plasma display panel.

The thin film EL element according to the present invention has a lower electrode layer, an insulator layer, a light emission layer, and an upper electrode layer formed on one side of the flat-panel-display substrate according to the present invention.

The insulator layer preferably includes lead and/or bismuth.

The present invention mentioned above can be expressed as the following (1) to (8).

(1) The flat-panel-display substrate obtained by sintering a mould comprising glass powder and a filler made of metal oxide and/or semi-metal oxide, the mould's average coefficient of linear thermal expansion being from 7 to 9.5 ppm/° C. in the temperature range of 25 to 700° C.; the glass powder including alkaline-earth oxide, 15 to 50% by weight of silicon oxide, and no less than 0% and no greater than 2% by weight of boron oxide to create crystal phases by itself or by reacting with the filler when sintered, the filler being at a concentration of 10 to 30% by volume of the total amount of the glass powder and the filler in the mould.

(2) The flat-panel-display substrate wherein the glass powder includes alkaline-earth oxide at a concentration of 35 to 55% by weight.

(3) The flat-panel-display substrate of the above (1) or (2) wherein the glass powder includes alkali-metal oxide and phosphorous oxide respectively at a concentration of 0 to 1% by weight.

(4) The a flat-panel-display substrate of any of the above (1) to (3) wherein the glass powder includes:
silicon oxide at a concentration of 25 to 50% by weight,
barium oxide at a concentration of 0 to 45% by weight,
strontium oxide at a concentration of 0 to 45% by weight,
calcium oxide at a concentration of 0 to 15% by weight, magnesium oxide at a concentration of 0 to 15% by weight, aluminum oxide at a concentration of 5 to 15% by weight, and titanium oxide and/or zirconium oxide at a concentration of 5 to 30% by weight.

(5) The flat-panel-display substrate of any of the above (1) to (4) wherein the filler includes at least one of alumina, forsterite, and zirconium.

(6) The flat-panel-display substrate of any of the above (1) to (5), which is used for a thin film EL element or a plasma display panel (7) The thin film EL element having a lower electrode layer, an insulator layer, a light emission layer, and an upper electrode layer formed on an electrically-insulating substrate, wherein:

the substrate is a flat-panel-display substrate of any of the above (1) to (5).

(8) The thin film EL element of the above (7) wherein the insulator layer includes lead and/or bismuth.

DESCRIPTION OF THE PREFERRED EMBODIMENTS

An embodiment of the present invention will be described in detail below. Note that for the sake of convenience in illustrating, the ratios of sizes in the drawings are not limited to values shown in the drawings, and do not necessarily coincide with those in the description. Furthermore, the description will be based on the positional relationships such as above, below, left, and right shown in the drawings as long as otherwise indicated.

Figure 1:
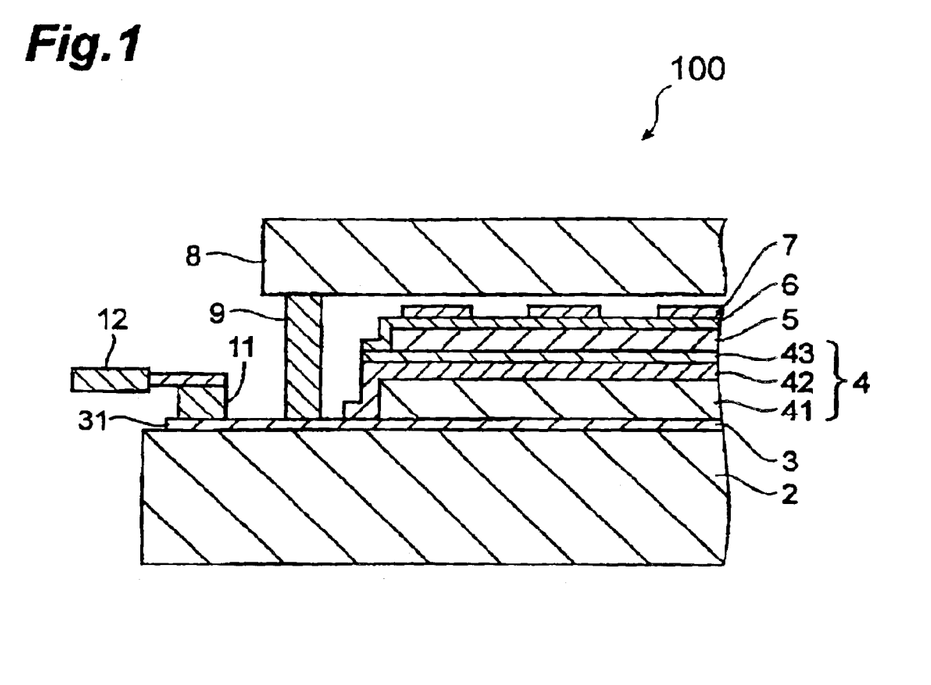
FIG. 1 is a cross-sectional view schematically showing a preferred embodiment of a thin film EL element according to the present invention.

FIG. 1 is a cross-sectional view schematically showing a preferred embodiment of the thin film EL element according to the present invention. A thin film EL element 100 has a lower electrode layer 3, a lower insulator layer 4, a light emission layer 5, an upper insulator layer 6, and an upper electrode layer 7, which are overlaid in that order on an electrically-insulating substrate 2. A thick film dielectric layer 41, a surface flattening layer 42 and a thin film insulator layer 43 are overlaid, to form the electrically-insulating substrate 2., The lower electrode layer 3 and the upper electrode layer 7 respectively are patterned like stripes as in the thin film EL element 10 of FIG. 2, and are operated on as mentioned previously.

The thin film EL element 100 is provided with a panel front protective glass 8 and sealing members 9, with which the light emission layer 5 is sealed in so as to prevent the light emission layer 5 from degrading due to the ambient air, especially humidity.

In addition, the lower electrode layer 3 is extended to a lead portion 31, is electrically connected to a flexible print substrate 12 via an anisotropic conductive resin layer 11, and is electrically connected to an external driving circuit (not shown).

Note that while in FIG. 1 the thin film EL element 100 has the light emission layer 5 comprising a single layer, the light emission layer 5 may be made up of a plurality of light emission layers overlaid one after another along the film thickness direction, or have a structure where different kinds of light emission layers (picture elements) are arranged two-dimensionally in a matrix.

The configuration of the components of the thin film EL element 100 according to the present invention will be described in detail below.

(Substrate 2)

The inventor and the like, in view of the problems of the prior art previously mentioned, considered that the substrate 2 of the thin film EL element 100 needed the following characteristics:

(i) having heat resistance that the substrate is not deformed by heat process at temperatures of at least 700° C. or higher, preferably 800° C. or higher, or greater preferably 850° C. or higher, which is equivalent to the heat resistance of an alumina substrate, in order to form at least a part of the lower insulator layer 4 from a thick film dielectric layer, (ii) the average coefficient of linear thermal expansion being 7 ppm/° C. or greater in the temperature range of room temperature to 700° C. in the viewpoint of matching of the coefficient of thermal expansion in a temperature lowering process when the thick film dielectric layer is sintered, because sintering starting temperature of the thick film dielectric layer is at least 700° C. or higher, (iii) the substrate's coefficient of linear thermal expansion being nearly equal to that of soda lime glass (8 to 9 ppm/° C.), preferably 9.5 ppm/° C. or below because inexpensive soda lime glass can be used as the panel front protective glass 8, (iv) including no component that adversely affects the light emission characteristic of the light emission layer, and the withstand voltage characteristic of the dielectric layer, of the EL element, (v) in the case of the EL element, the dielectric layer is preferably made of a material of a high dielectric constant and high withstand voltage, and an oxide dielectric material including lead is particularly preferably used as the high-dielectric-constant thick film material because it can be easily sintered at a low temperature and the high dielectric constant can be easily achieved, which will be described later in detail; however, the problem that oxide dielectric material including lead easily reacts with other oxides even at low temperatures exists, and therefore the substrate needs to include no components reactive with a lead-based dielectric or include sufficiently little of them; further, the substrate needs to include no components (e.g. alkali-metal and phosphorous) that adversely affect the light emission layer 5 whose main material is ZnS or include sufficiently little of them, (vi) being good in the polishing characteristic, this characteristic being important to achieve surface flatness at low cost, which flatness is important for a a flat-panel-display substrate, and needing to be a dense, sintered body because pores such as air holes included in the substrate produces display defects, and (vii) being mechanically strong enough as a flat-panel-display substrate.

In order to achieve these characteristics, the inventor and the like examined in detail glass ceramic materials good in heat resistance and great in the coefficient of linear thermal expansion and in the flexibility of composition. As a result, it is found out that the sintered body is most suitable as the substrate 2 of the thin film EL element, which is obtained by sintering a body comprising glass powder including alkaline-earth oxide and filler made of metal and/or semi-metal oxide, the filler being at a concentration of 10 to 30% by volume of the total amount of the glass powder and the filler in the body, and whose average coefficient of linear thermal expansion is from 7 to 9.5 ppm/° C. in the temperature range of 25 to 700° C.

The average coefficient of linear thermal expansion β in the temperature range of 25 to 700° C. is expressed as the following, where $L_{25}$ and $L_{700}$ are the length of a to-be-measured sample at temperatures of 25° C. and 700° C. respectively, $$\beta = \{(L_{700}-L_{25})/(700-25)\}/L_{25}.$$

The value can be calculated from the equation.

The glass powder included in the mould creates crystal phases by itself or by reacting with the filler when sintered. Therefore, the substrate 2 of the present invention is a glass ceramic sintered substrate including crystallized glass.

A substance is most suitable as the filler, which is high in heat resistance, close to the substrate 2 in the coefficient of linear thermal expansion when being alone, excellent in mechanical strength, low in reaction with the lead-based, and obtainable at low cost.

Preferably the above-described filler includes oxide, particularly at least one kind of oxide selected from among alumina, forsterite, and zirconium. In particular, the total of concentrations of alumina, forsterite, and zirconium in the filler is preferably 70 to 100% by volume. Here, stabilized zirconium, $ZrO_2$ having a stabilizer such as $Y_2O_3$ doped therein, is preferable as zirconium.

Note that one available commercially can be used as the filler. Further, the shape of a piece of the filler is not restricted to any but may be a spherical shape, an unfixed shape, like a whisker, like a grain of ground powder, or the like. Yet further, the average diameter of the pieces of the filler is preferably from about 0.5 to 5 μm in the present invention, but it is not limited to any.

The effects of the filler are that the heat resistance and mechanical strength of the glass ceramic sintered substrate can be improved and that reaction with a lead-based dielectric in the substrate can be reduced. Accordingly, when the amount of the filler is too small, the effects tend to become too small. Specifically, when the filler is at a concentration of less than 10% by volume of the total amount of the glass powder and the filler, the mechanical strength at high temperatures tends to decrease greatly. This is not preferable because heat deformation is likely to occur in a later heat process where the temperature is below about 800° C., in forming an EL element.

The effects of the filler can be improved by increasing the amount thereof, but when the filler component mechanically more rigid than the glass component is too much, the polishing characteristic is degraded involving the cost increase in the polishing, and therefore it is not preferable.

In addition, if the amount of the filler is excessive (the amount of the glass component being too small), the fluid component is in short supply when forming (sintering) a glass ceramic, so that the density of the sintered body may not be high enough, or that the pores in the sintered body may increase in number. Furthermore, because the glass component has an effect of flattening the sintered body's surface, the coarseness of the sintered body's surface increases if the amount of the filler is excessive. As a result, the number of the steps, and the cost, in the polishing process tend to increase.

A decrease in the density of the sintered body and increases in the number of pores and in the coarseness of the sintered body's surface cause a degradation of the surface flatness of the substrate 2. Moreover, even if the sintered body's surface is flattened by polishing, the polishing causes inner pores to be exposed, so that pits appears on the substrate surface.

For example, in the case of the thin film EL element 100, because the thickness of the lower insulator layer 4 formed on the substrate 2 is from about 20 to 30 μm, too many pits lead to a fatal defect such as a pressure-resistance failure of the lower insulator layer 4.

According to the study by the inventor and the like, it is found out that, in order to limit the density of pores to within the permissible range and to heighten the evenness of the surface when polished, it is effective for the filler to be at a concentration of no greater than 30%, preferably no greater than 25%, more preferably no greater than 20%, by volume of the total amount of the glass powder and the filler.

Herein, the concentration by volume of the filler (volume ratio) is calculated from their volumes calculated from the respective masses and real densities. For example, the volume of the glass powder is expressed as $M_G/\rho_G$, where $M_G$ is the mass, and $\rho_G$ is the real density, and the volume of the filler is expressed likewise.

Preferably the glass powder does not substantially include boron oxide. The concentration of boron oxide is preferably at 0% or greater and less than 2% by weight in terms of $B_2O_3$, more preferably from 0 to 1% by weight.

In addition, preferably the glass powder does not substantially include alkali-metal oxide and phosphorous oxide. The concentration of alkali-metal oxide is preferably from 0 to 1% by weight in terms of $M^I_2O$, where $M^I$ is alkali-metal, more preferably from 0 to 0.5% by weight. The concentration of phosphorous oxide is preferably from 0 to 1% by weight in terms of $P_2O_5$, more preferably from 0 to 0.5% by weight.

Note that although preferably no boron oxide, alkali-metal oxide, and phosphorous oxide are included in the glass powder, without intentional doping, traces of them usually tend to be included as inevitable impurities therein.

When diffusing into the light emission layer 5, the alkali component becomes moving ions to have very adverse effects on the light emission characteristic and lifetime, and thus is not preferable. The alkali and phosphorous components diffusing into the lower insulator layer 4 degrades the withstand voltage lifetime characteristic of the lower insulator layer 4. Hence, preferably the glass powder does not substantially include these components.

Because the boron component together with lead oxide forms liquid phases whose melting point is as low as below 600° C., in the case of using a lead-based dielectric material as the lower insulator layer 4, the reaction between the substrate 2 and the lower insulator layer 4 increases greatly to be likely to cause the problems such as abnormal sintering and failure in dielectric constant. Thus, the light emission characteristic of the thin film EL element may be affected very adversely.

Because silicon oxide is a necessary component as a network former in glass, when the concentration thereof is too low, the fluidity of the glass decreases so that the glass ceramic sintered body's density tends to decrease. However, because like boron, silicon oxide together with lead oxide forms liquid phases whose melting point is as low as below 700° C., in the case of using a lead-based dielectric material as the lower insulator layer 4, the reaction between the substrate 2 and the lower insulator layer 4 tends to increase greatly if the concentration of silicon oxide in the substrate 2 is too high.

Furthermore, since silicon oxide together with lead oxide is likely to form a low dielectric-constant compound such as $PbSiO_4$, the silicon oxide causes the problems such as abnormal sintering and failure in dielectric constant, so that it may very adversely affect the light emission characteristic of the thin film EL element 100. Moreover, when silicon oxide is too much, the fluidity of the glass degrades when melted, and hence it is hard to obtain the dense sintered body, and further the sintered body's coefficient of thermal expansion tends to decrease, which is also undesirable.

In addition, the substrate 2 according to the present invention is made of a glass composition crystallized by sintering in which crystal phases of multi-oxide including alkaline-earth metal and silicon oxide and crystal phases of multi-oxide great in the coefficient of thermal expansion are formed. That is, since silicon oxide is contained in the crystal phases of multi-oxide, the silicon oxide is more highly stable and less in reactivity, thereby reducing the effects of the above problems.

According to the insight of the inventor and the like, in order to achieve these effects and sufficiently suppress the reaction with a lead-based dielectric material, the concentration of silicon oxide in the glass powder is from 15 to 50% by weight in terms of $SiO_2$, preferably from 25 to 50% by weight, more preferably from 28 to 45% by weight. Furthermore, the concentration of alkaline-earth oxide is preferably from 35 to 55% by weight in terms of $M^{II}O$, where $M^{II}$ is alkaline-earth oxide, more preferably from 35 to 50% by weight.

After sintered, while the degree of crystallization of glass in the substrate 2 according to the present invention varies depending on the filler used, a sintering condition and a slowly-chilling condition of the mould, heightening the degree of crystallization may produce the advantage that the strength of the substrate 2, a glass ceramic sintered body, can be further increased as well as the above effects.

However, if the degree of crystallization is too high, the problems occur such that the surface coarseness of the substrate 2, which is a glass ceramic sintered body, increases and the substrate becomes too rigid, thereby degrading in mechanical workability, and that the slowly-chilling time at high temperatures for crystallization is lengthened to cause the increase of production cost. For these reason, various conditions are preferably set such that the degree of crystallization of glass in the substrate 2 is from 20 to 70%, preferably from 40 to 60%. In this way, good polishing workability as well as sufficient mechanical strength can be achieved.

Crystal phases of alkaline-earth crystallized glass great in the coefficient of thermal expansion can be, for example, $Sr_2TiSi_2O_8$, $Ba_{0.9}Sr_{0.1}Al_2O_8$, $BaAl_2Si_2O_8$ (celsian), and $BaCa_2Si_3O_9$.

The composition of crystallized glass that precipitates these crystal phases is specifically as follows:

silicon oxide at a concentration of preferably 25 to 50% by weight in terms of $SiO_2$, more preferably 28 to 45% by weight, barium oxide at a concentration of preferably 0 to 45% by weight in terms of BaO, more preferably 10 to 30% by weight, strontium oxide at a concentration of preferably 0 to 45% by weight in terms of SrO, more preferably 10 to 30% by weight, calcium oxide at a concentration of preferably 0 to 15% by weight in terms of CaO, magnesium oxide at a concentration of preferably 0 to 15% by weight in terms of MgO, aluminum oxide at a concentration of preferably 5 to 15% by weight in terms of $Al_2O_3$, and titanium oxide and/or zirconium oxide at a total concentration of preferably 5 to 30% by weight in terms of $TiO_2$ and/or $ZrO_2$ respectively.

In the above composition, barium oxide and strontium oxide are important components in terms of forming alkaline-earth glass great in the coefficient of thermal expansion. If none of these are included or the concentrations thereof are too low, when making a glass ceramic sintered body by sintering, the amount of created multi-oxide crystal phases having great coefficients of thermal expansion may be so small as to cause inconvenience, in which case the sintered body's coefficient of thermal expansion tends to decrease.

In addition, if the concentrations of those components are above the upper limits, the crystallization of glass occurs to an unnecessary degree in making glass material that is the base of the glass powder (vitrifying), and the glass component is crystallized too much. Furthermore it is difficult to obtain a dense sintered body, in sintering the glass powder and the filler (when producing a sintered body). Therefore, it is undesirable for the concentrations to be above the upper limits.

Only one of barium oxide and strontium oxide may be included, but combination of the both are preferably included.

Since barium oxide is effective in expanding the areas of glass and making the glass low in viscosity, it is preferably included in the glass powder. That is, because, by using both barium oxide and strontium oxide, the viscosity in vitrifying decreases compared with using strontium oxide alone, the uniform resolvability of glass can be improved. Moreover, the glass powder becomes low in viscosity when resolved in producing a sintered body, so that a dense sintered body is more easily obtained.

Note that when using barium oxide alone, the glass component tends to be crystallized excessively, and thus optimum conditions in vitrifying and in producing a sintered body are likely to be narrowed in the range.

On the other hand, if strontium oxide is included therein, it prevents crystallization of the glass component from proceeding too much. Therefore, in the present invention, combination of the barium oxide and strontium oxide is preferable in concentrations in the ranges previously mentioned. Thereby, compared with the case of using only either of the components, better control of characteristics of glass viscosity, crystallization, sintering, etc., in vitrifying and in producing a sintered body is achieved, so that productivity in producing the sintered body can be improved.

Preferably calcium oxide is included in the glass powder in order to promote resolution in vitrifying. Note that if calcium oxide is excessive, anorthite crystal phases having a small coefficient of thermal expansion come to be easily precipitated, which is undesirable.

Magnesium oxide produces almost the same effect as calcium oxide and the effect of decreasing viscosity in vitrifying to prevent loss of clarity. Note that, if too much magnesium oxide is included, the coefficient of thermal expansion tends to become small.

The total concentration of alkaline-earth oxides, i.e., BaO, SrO, CaO and MgO is preferably from 35 to 55% by weight in terms of $M^{II}O$, more preferably from 35 to 50% by weight as previously mentioned. When the total concentration of the alkaline-earth oxides is less than 35% by weight, the resolvability in vitrifying tends to degrade and the coefficient of thermal expansion of glass phases tends to become small, thereby making the coefficient of thermal expansion of the substrate 2, a glass ceramic sintered body, small.

On the other hand, when the total concentration of the alkaline-earth oxides is beyond 55% by weight, the glass phase's distortion temperature decreases, and thereby the heat resistance of the substrate 2, serving as a glass ceramic sintered body, tends to decrease and the crystallization of crystallized glass tends to degrade because of the shortage of other components of crystallized glass phases. Therefore, the total concentration higher than 55% by weight is undesirable.

Aluminum oxide is included to appropriately control the crystallization in sintering and to be one of the components forming crystal phases such as celsian. When the concentration of aluminum oxide in the glass powder is less than 5% by weight, these effects tend to be insufficient, and when the concentration thereof is beyond 15% by weight, the fluidity of the glass phases decreases excessively, so that the density of the substrate 2, serving as a glass ceramic sintered body, tends to decrease. Therefore, those are undesirable.

Titanium oxide functions as a nucleus former, and is included as a component of alkaline-earth glass crystal phases in order to control the crystallization characteristic in sintering. Replacing a part or all of titanium oxide with zirconium oxide also gives the same effect.

Since titanium oxide is inexpensive and has an excellent characteristic as a nucleus former, the concentration (ratio) of titanium oxide is preferably from 50 to 100% by mole of the total amount of titanium oxide and zirconium oxide.

In addition, if the total concentrations of titanium oxide and zirconium oxide in the glass powder is less than the lower limit (5% by weight), enough of the above effect tends not to be obtained, and if the total concentrations is higher than the upper limit (30% by weight), the fluidity of the glass phases decreases to make the density of the substrate 2, serving as a glass ceramic sintered body, so small as to cause inconvenience. Therefore, those are undesirable.

To produce the substrate 2 of the present invention that is a glass ceramic substrate, a known method can be used. For example, a method can be used where material powder consisting of glass powder and filler having the above composition is mixed with an appropriate organic binder to grind it to powder, and then a mould is made thereof by use of a press forming method and sintered.

Alternatively, for example, a method can be used where the above material powder is mixed with an appropriate organic binder, a plasticizer, and a solvent to make slurry, and then a green sheet (mould) is made thereof by use of a doctor blade method or calendar roll method and sintered, or such sheets are laminated by pressure and sintered.

By using the press forming method, a rectangular press mould having a dimension of about 1 meter can be easily formed. Alternatively, by using the green sheet, a uniform green sheet having a width of below 1 meter at very low cost can be easily formed.

The method of sintering may be performed in such a way that mould is arranged on a known heat-resistive setter such as alumina, zirconium using a usual belt furnace, a roller hearth kiln, a batch furnace, or the like and sinter it in an oxidizing atmosphere such as the air at a temperature of 1000° C. or above and no higher than 1200° C. or 1300° C. usually for about 1 to 10 hours depending on the size of the substrate to be sintered.

In this way, the substrate 2 of the present invention is formed by sintering at a low temperature of no higher than 1200° C. or 1300° C. at the highest, and because an expensive furnace for sintering at a high temperature of no lower than 1400° C. or 1600° C. necessary to sinter an alumina ceramic substrate is not needed, the cost of sintering can be reduced greatly.

After sintering the glass ceramic substrate, a slowly chilling process is performed in order to crystallize the crystallized glass component. The slowly chilling conditions are usually a temperature of from about 900 to 1200° C. and a time period of from about 1 to 24 hours depending on the degree of crystallization of the crystallized glass to be aimed at.

Note that crystallization can be performed at the same time as the sintering by setting appropriately a falling temperature profile in the sintering of the furnace. That is, without providing a slowly chilling process independent of the sintering process, by lengthening the sintering time or by slowly chilling in the temperature falling process, which is a post-process in the sintering process, crystallization can be promoted.

Furthermore, after the crystallization, the surface flatness is improved by polishing as needed. Here, because the substrate 2 of the present invention is good in the characteristic of polishing, the flatness of the surface can be improved at low cost. Hence, the substrate 2 having a large area can be produced at low cost and with good productivity.

(Lower Electrode Layer 3)

The material of the lower electrode layer 3 is preferably a material which produces high conductivity, hardly thermally damaged in oxidizing atmosphere when forming a thick film dielectric layer 41, and which is low in reaction with the lower insulator 4 and the light emission layer 5.

Such a material is a precious metal such as Au, Pt, Pd, Ir, or Ag, a precious metal alloy such as Au—Pd, Au—Pt, Ag—Pd, or Ag—Pt, or an alloy based on a precious metal such as Ag—Pd—Cu and having a non-metal element doped. Because of being excellent in withstanding oxidization by the oxidizing atmosphere when forming a thick film dielectric layer 41, these are preferable.

It may be that with using a base metal such as Ni or Cu, oxygen partial pressure in sintering a thick film dielectric layer 41 is adjusted to within such a range that the base metal is not oxidized.

The film thickness of the lower electrode layer 3 is preferably from about 0.3 to 1 µm in view of the resistivity.

The method of forming the lower electrode layer 3 is not limited to any, but a known technology such as a sputtering method, a vapor deposition method, a plating method, or a print method using organic metal paste (resinate-metal paste) can be used.

When it is of a simple matrix type, the lower electrode layer 3 is patterned like stripes, i.e. multiple linear electrodes. In this case, because each electrode's width is a picture element's width and the spaces between two adjacent electrodes are non-light emission areas, the spaces between the electrodes are preferably as narrow as possible. Specifically, the electrode's width is from about 200 to 500 µm and the space's width is from about 20 to 50 µm depending on the resolution of the display to be aimed at.

(Thick Film Dielectric Layer 41)

The lower insulator 4 needs to be high in dielectric constant and withstand voltage. With this, an EL element high in brightness and that can be driven at a low voltage can be accomplished. By making the thick film dielectric layer 41 constitute most of the lower insulator 4, a dielectric constant no lower than 100 times that of a thin film dielectric layer can be achieved.

Here, a "thick film dielectric layer" refers to a dielectric layer formed by use of a so-called thick film method, that is, a ceramic layer formed by sintering a powder-like insulator material. The thick film dielectric layer 41 is formed, for example, by coating an insulator paste, where a powder-like insulator material, a binder, and a solvent are mixed, on the substrate 2 having the lower electrode layer 3 formed and sintering it. It can also be formed by making a film of the insulator paste by casting to form a green sheet, overlaying it on the substrate 2 having the lower electrode layer 3 formed and sintering it.

The material of the thick film dielectric layer 41 is not limited to any, but is preferably a (ferro-) dielectric material having a perovskite structure such as $BaTiO_3$, $(Ba_xCa_{1-x})TiO_3$, $(Ba_xSr_{1-x})TiO_3$, $PbTiO_3$, or PZT; a composite-perovskiterelaxer-type ferroelectric material represented by $Pb(Mg_{1/3}Nb_{2/3})O_3$, etc.; a bismuth-layer-like compound represented by $Bi_4Ti_3O_{12}$, $SrBi_2Ta_2O_9$, etc.; or a tungsten-bronze-type ferroelectric material represented by $(Sr_xBa_{1-x})Nb_2O_6$, $PbNb_2O_6$, etc.

Note that PZT refers to $Pb(Zr_xTi_{1-x})_3$. Of these, a ferroelectric material having a perovskite structure such as $BaTiO_3$ or PZT is more preferable because of the high dielectric constant and easiness in sintering.

In particular, a dielectric material including lead as a component comes to be easily sintered at a low temperature by use of a sintering coadjutant and have a high dielectric constant because the melting point of lead oxide is as low as 888° C. and forms a liquid phase at a low temperature of about 600 to 800° C. with other oxide-based materials such as $SiO_2$, CuO, $Bi_2O_3$, or $Fe_2O_3$. Therefore, it is preferable.

Preferable as a dielectric material including lead are a perovskite-structured material such as PZT or PLZT ($PbZrO_3$—$PbTiO_3$ solid solution having La doped), a composite-perovskiterelaxer-type ferroelectric material represented by $Pb(Mg_{1/3}Nb_{2/3})O_3$, etc., and a tungsten-bronze-type ferroelectric material represented by $PbNb_2O_6$, etc. These can easily form the thick film dielectric layer 4 having a relative dielectric constant of 1000 or greater at a sintering temperature of about 800° C., and of these, the composite-perovskiterelaxer-type ferroelectric material is especially preferable because of being able to have a high dielectric constant beyond 10,000.

The thickness of the thick film dielectric layer 41 is preferably equal to at least 10 μm or greater, more preferably 20 μm or greater in order to exclude pinholes that would otherwise be formed due to the electrode's steps or dust, etc., in the production process. Note that in order to prevent the rise of the threshold voltage of light emission, the total thickness of the thick film dielectric layer 41 and a surface flattening layer 42 is preferably 100 μm or less.

The present invention's substrate 2, a glass ceramic sintered body, is low in reaction with the lead component unlike a usual substrate made of glass, and hence the lead-based dielectric material that can be sintered at a low temperature and have a high dielectric constant can be used. Therefore, by using the present invention's substrate 2, the characteristic of the thin film EL element 100 can be greatly improved in the characteristics.

(Surface Flattening Layer 42)

The surface flattening layer 42 is provided in order to reduce the surface unevenness of the lower insulator layer 4 due to the irregularities made on the surface of the thick film dielectric layer 41, and in forming the surface flattening layer 42 a solution coating sintering method can be used.

Here, the "solution coating sintering method" refers to a method of forming a dielectric layer by coating a precursor solution of a dielectric material over a substrate and sintering it, and for example a sol-gel method and a MOD (Metallo-Organic decomposition) method are known.

The "sol-gel method" is a method of forming a film by coating over a substrate a precursor solution of the M-O-M bonding which is obtained by adding a predetermined amount of water to metal-alkoxide resolved in a solvent to cause hydrolysis and polyesterification reaction, and sintering it.

The "MOD method" is a method of forming a film by coating over a substrate a precursor solution where metallic salt of carboxylic acid having M-O bonds is resolved in an organic solvent, and sintering it. Here, the "precursor solution" refers to a solution including an intermediate compound created by resolving a material compound in a solvent in a film forming method such as the sol-gel method and the Mob method.

Note that the sol-gel method and the MOD method are not completely separate methods, and usually used in combination. For example, in forming a PZT film, a solution is made generally by using lead acetate as a lead source and alkoxide as Ti and Zr sources.

While the two methods, the sol-gel method and the MOD method, are also generically called a sol-gel method, these are generically called a solution coating sintering method in this description because, in any case, a film is formed by coating a precursor solution over a substrate and sintering it.

In addition, a solution prepared by mixing sub-micrometer-sized dielectric particles and a precursor solution are mixed is also called a precursor solution in this description, and a method for coating the solution over a substrate and sintering is also called a solution coating sintering method.

In the solution coating sintering method, whether the sol-gel method or the MOD method, particles of a compound constituting a dielectric constant is uniformly mixed with the order under sub-micron. Therefore, the above method has an advantage that a dense dielectric can be composed at a very low temperature compared with a method using essentially the sintering of ceramic powder such as the thick film method.

When the solution coating sintering method is used, by undergoing the process of coating a precursor solution and sintering, the film is formed in such a way as to be thick at a recess and thin at a protruding part in the under-lying layer. As a result, the surface of the film does not reflect the unevenness and steps of the substrate surface, thereby forming a flat-surfaced film is formed.

Therefore, by forming the surface flattening layer 42 by use of the solution coating sintering method, the coarseness of the surface of the thick film dielectric layer 41 becomes not reflected by the surface shape of the lower insulator layer 4, thereby greatly improving the uniformity of the light emission layer 5 formed on the lower insulator layer 4.

It is only necessary to determine the thickness of the surface flattening layer 42 so that the unevenness on the surface of the thick film dielectric layer 41 may be covered for the surface to be flat. Usually the thickness of the surface flattening layer is preferably set to 0.5 μm or greater, more preferably set to 1 μm or greater, even more preferably 2 μm or greater. Note that when covering the unevenness of the thick film dielectric layer 41 is aimed at, usually the thickness of the surface flattening layer 42 does not need to be beyond 10 μm.

The higher the relative dielectric constant of the surface flattening layer 42 is, the more it is preferable. The relative dielectric constant is preferably set to 100 or greater, more preferably set to 500 or greater. As a dielectric material capable of having such a high dielectric constant, a perovskite-structured ferroelectric material such as $BaTiO_3$, $(Ba_xCa_{1-x})TiO_3$, $(Ba_xSr_{1-x})TiO_3$, $PbTiO_3$, PZT, or PLZT; a composite-perovskiterelaxer-type ferroelectric material represented by $Pb(Mg_{1/3}Nb_{2/3})O_3$, etc.; a bismuth-layer-like compound represented by $Bi_4Ti_3O_{12}$, $SrBi_2Ta_2O_9$, etc.; or a tungsten-bronze-type ferroelectric material represented by $(Sr_xBa_{1-x})Nb_2O_6$, $PbNb_2O_6$, etc. is preferable.

Of these, a lead-based composite perovskite-structured ferroelectric material including lead oxide as a component such as PZT or PLZT is preferable because of the high dielectric constant and being easily composed at a relatively low temperature of 700° C. or below.

In addition, an organic, film-forming coadjutant such as polyalcohol or macromolecules having a polar group may be added to the coating liquid (precursor solution) in order to obtain the surface flattening layer 42 aimed at by coating and sintering once with preventing the occurrence of cracks or break-away in the sintering. In this way, a thick film having a thickness of about 0.5 to 1 µm can be formed by coating and sintering once.

As examples of the organic, film-forming coadjutant, for example, alkanediols such as 1,3-propanediol or neopentyl glycol, glycols such as polyethylene glycol or polypropylene glycol, polar macromolecules such as polyvinyl-pyrrolidone, polyvinyl-acetamide or hydroxy-propyl-cellulose are listed.

Note that the lower insulator layer 4 is not limited to the above mentioned structure, but, when the material of the thick film dielectric layer 41 is a dielectric material without lead ($BaTiO_3$, etc.), it may have a low-melting-point composite lead oxide such as lead glass or $Pb_5Ge_3O_{11}$ as a sintering coadjutant, etc., doped therein. In a conventional substrate, the lead oxide may react with the substrate. On the other hand, in the substrate 2 according to the present invention, such inconvenient reaction can be avoided.

Also when a bismuth dielectric material represented by $Bi_4Ti_3O_{12}$, $SrBi_2Ta_2O_9$, etc., is used, the use of the substrate 2 of the present invention is effective because bismuth are similar to those of lead in physical properties and easily reacts with silicon oxide and boron at low temperatures.

Furthermore, all part of the lower insulator layer 4 other than the thin film insulator layer 43 may be formed by use of the solution coating sintering method, or the entire lower insulator layer 4 may be formed by use of a vapor phase deposition method such as the sputtering or CVD method. Here, if the temperature of the substrate is 600° C. or greater in forming the lower insulator layer 4, by using the substrate 2 of the present invention, the reaction of the substrate 2 and the lower insulator layer 4 can be avoided.

(Thin Film Insulator Layer 43 and Upper Insulator Layer 6)

Although the thin film EL element 100 does not necessarily need to comprise the thin film insulator layer 43 and the upper insulator layer 6 by coming into contact with the light emission layer 5, so as to sandwich it, it preferably comprises them from the following point of view.

That is, by providing the insulator layers 6 and 43, the electron states in the boundary surfaces between the insulator layers 6, 43 and the light emission layer 5 come to be able to be easily controlled, thereby stabilizing the electron injection into the light emission layer 5, increasing efficiency.

Since the light emission layer 5 is located in between the insulator layers 6, 43, that is, the insulator layers 6, 43 are provided symmetrically on both sides of the light emission layer 5, the electron states are symmetric in both the boundary surfaces of the light emission layer 5. Thus the positive-negative symmetry of the light emission characteristic can be improved when driving with an alternating voltage.

Because it does not need to ensure the withstand voltage, the insulator layers 6, 43 can be thin in the film thickness, preferably 10 to 1,000 nm, more preferably about 20 to 200 nm.

The resistivity of the insulator layers 6, 43 is preferably at or above $10^8$ Ωcm, especially $10^{10}$ to $10^{18}$ Ωcm. The insulator layers 6, 43 are preferably made of a material having a relatively high relative dielectric constant, of 3 or greater specifically.

As such a material can be, for example, silicon oxide ($SiO_2$), silicon nitride ($Si_3N_4$), tantalum oxide ($Ta_2O_5$), yttrium oxide ($Y_2O_3$), zirconia ($ZrO_2$), silicon oxy-nitride (SiON), alumina ($Al_2O_3$), and the like can be used. The sputtering, vapor deposition, or CVD method can be used for forming the insulator layers 6, 43.

(Light Emission Layer 5)

The fluorescent material forming the light emission layer 5 is not limited to any, but may be any fluorescent material such as the Mn-doped ZnS. The light emission layer 5 is not limited in thickness to any, but, when too thick, the driving voltage required tends to increase, and on the other hand, when too thin, the light emission efficiency tends to decrease. Specifically, the thickness is preferably set to 100 to 2,000 nm depending on the kind of light emission material.

To form the light emission layer 5, the general vapor phase deposition method can be used. As the general vapor phase deposition method, a PVD method (physical vapor phase deposition method) such as the sputtering or vapor deposition method, or the CVD (chemical vapor phase deposition method) method is preferable.

When forming the light emission layer 5 made of SrS:Ce as previously mentioned, the film may be formed keeping the substrate at a temperature of 500 to 600° C. under an $H_2S$ atmosphere by use of an electron beam vapor deposition method, the light emission layer 5 of high purity can be obtained.

In forming the light emission layer 5, it is preferably annealed after depositing the composite material. The annealing can be performed in a state where the light emission layer 5 is exposed, or can be cap-annealing which is performed after the upper insulator layer 6 is formed on the light emission layer 5 or after the upper electrode layer 7 is further formed thereon.

The optimum annealing temperature varies depending on the kind of light emission layer's material. For example, in the case of SrS:Ce, preferably the annealing temperature is set to 500° C. or greater, especially 600° C. or greater and at or below the sintering temperature for the thick film dielectric layer 41. The process time is preferably set as 10 to 600 minutes. Note that the annealing is preferably performed in an Ar atmosphere.

In order to form the light emission layer 5 of a fluorescent material excellent in characteristics such as SrS:Ce or barium-thio-aluminate, the forming of the film at a high temperature of 500° C. or greater and the high-temperature annealing thereafter are necessary.

In this case, if using a conventional glass substrate, the reaction of the substrate and the lower dielectric layer 4 and the element diffusion inevitably have adverse effects on the light emission layer 5. On the other hand, the substrate 2 of the present invention itself is high in heat resistance and low in reaction with the lower dielectric layer 4 and the light emission layer 5 as previously mentioned.

Therefore, by using the substrate 2 of the present invention, even in forming the light emission layer 5 of SrS:Ce or barium-thio-aluminate, the degradation due to the reaction and the element diffusion can be suppressed, so that the thin film EL element 100 excellent in characteristics can be accomplished.

(Upper Electrode Layer 7)

Since, in the thin film EL element 100 shown in FIG. 1, light is produced from the upper electrode layer 7 side, the upper electrode layer 7 is formed by a transparent conductive material. Used as the transparent conductive material can be $In_2O_3$, $SnO_2$, ITO, an oxide conductive material such as ZnO—Al or the like. The upper electrode layer 7 can be formed by use of a known method such as the sputtering method, the vapor deposition method or the like. And the thickness of the upper electrode layer 7 is usually from about 0.2 to 1 $\mu$m.

(Flat Panel Display Except Thin Film EL Element)

While the application of the flat panel display substrate according to the present invention has been described taking the thin film EL element as an example, the use of the flat panel display substrate according to the present invention is not limited thereto, but can be used as, for example, the back substrate of a plasma display panel (PDP) to make good use of the high heat resistance, flatness at a low cost and alkalinity.

A PDP generally has a structure where front and back substrates are provided opposite to each other, a dielectric layer is formed on the back substrate, a barrier is formed on the dielectric layer, and the space surrounded by both the substrates and the barrier forms a cell inside which a fluorescence layer is formed.

Conventionally, soda lime glass or high distortion-point glass is used as the back substrate, but its heat resistance is of as low as about 550 to 650° C., and thus, the problem of thermal distortion deformation characteristic of glass occurs in forming the back substrate.

For that reason, lead-based low-melting-point glass needs to be used as the material of the barrier and the dielectric layer formed on the back substrate. Moreover, the barrier is very thick having a thickness of 200 $\mu$m or greater and made of a lot of lead glass, and thus, poses a problem in terms of an environmental load as well.

On the other hand, because the flat panel display substrate according to the present invention has a heat resistance of 800° C. or greater. Then if the flat panel display substrate according to the present invention is used as the back substrate of a PDP, non-lead low-melting-point glass such as zinc-boron silica having a melting point of about 100° C. greater than that of lead-based low-melting-point glass can be used as the material of the barrier and the dielectric layer.

Furthermore, the flat panel display substrate according to the present invention does not have thermal distortion deformation characteristic of glass occur in the production process. Therefore, according to the present invention, a plasma display good in flatness and without toxic substances can be produced easily at a low cost.

EXAMPLES OF EMBODIMENT

The present invention will be described in more detail with using examples of the embodiment, but is not limited thereto.

Embodiment Example 1

Glass materials were blended so as to achieve the composition of each of Sample Nos. 1, to 13 shown in table 1, and resolved in a platinum skull crucible furnace at a temperature of 1500° C. for 3 to 10 hours to create cullets with a predetermined cooling. The created cullets were ground into glass powder of particles having a diameter of 10 $\mu$m or less by use of a wet grinding method. Note that "AEO" in the glass composition of table 1 refers to the concentration of alkaline-earth oxide.

particles of forsterite ($Mg_2SiO_4$), alumina ($Al_2O_3$), and stabilized zirconia (YSZ) having average diameters of 1 to 3 $\mu$m as fillers were each added by the amount shown in table 1 and mixed, and after mixed with an organic binder, a cylinder-shaped mould having a diameter of 30 mm and a height of 10 mm was made by use of a press method; by sintering these in the air at a temperature of 1200 to 1300° C., measurement samples (Nos. 1 to 13) of glass ceramic sintered bodies were obtained. It was confirmed that all samples (Nos. 1 to 13) were crystallized after the sintering.

Comparison Example 1

Except that, glass materials were blended so as to achieve the composition of each of Sample Nos. 14 to 17 shown in table 1, in the same way as in embodiment example 1, measurement samples (Nos. 14 to 17) were obtained. As Sample No. 18, a 96%-alumina ceramic sintered body was also made.

(Measurement Evaluation 1)

The curve of linear thermal expansion of each sample No. 1 to 18 was measured to obtain an average coefficient of linear thermal expansion in the range of 25 to 700° C., the result of which is shown in table 1. The deflection point of the curve of linear thermal expansion of each sample is also shown as heat resistance strength in table 1.

(Measurement Evaluation 2)

The glass powder and the fillers for each sample were mixed with a binder made of acrylic resin, an organic solvent, and a plasticizer to make slurry, and the slurry was coated by use of the doctor blade method over a resin sheet coated with a remover, to make a green sheet. A plurality of green sheets were laminated and thermo-compression bonded, which was then sintered at a temperature of 1200 to 1300° C., to thereby make a sintered body substrate sample having a plane size of 5 by 5 inches and a thickness of 1.5 mm.

For these samples, the percentage of moisture content, strength against bending (three-point bending strength), and reactivity with the thick film dielectric layer made of a lead-based material were evaluated, the results of which are also shown in table 1. Note that a known method was used in the evaluation of the percentage of moisture content.

(Measurement Evaluation 3)

The reactivity of the substrate with the thick film dielectric layer made of a lead-based material was evaluated in the following way. First, Au paste commercially available was printed (coated) over the entire substrate surface for the thickness to be at 1 μm after sintering, and by sintering at a temperature of 800° C., the lower electrode layer was formed. Next, coating the thick film dielectric paste and drying it by use of the screen printing were repeated for the thickness to be at 20 μm after sintering. This thick film dielectric paste is 4210C, product of ESL Corporation, and has a $Pb(Mg_{1/3}Nb_{2/3})O_3$-based perovskite dielectric as a base and too much of lead oxide as a sintering coadjutant.

After printing and drying, binder-removing sintering was performed using an electric furnace in an atmosphere where enough air was being supplied at 450° C. for 30 min., and full sintering was performed at 800° C. for 30 min., to form a thick film dielectric layer. On this thick film dielectric layer, multiple dot-like Au thin film pieces having a film thickness of 300 nm and a diameter of 1 mm were formed as an upper electrode by the vacuum vapor deposition method using a metal stencil mask.

Next, by using an LF impedance meter, the static capacitance of the thick film dielectric layer was measured at a frequency of 100 kHz to calculate the dielectric constant (∈) therefrom. The reactivity of the substrate with the thick film dielectric layer was evaluated based on the value thereof, the result of is which is shown in table 1.

From table 1, the thick film dielectric layers formed on the substrates of the present invention produce dielectric constants equivalent to that of the thick film dielectric layer formed on an alumina ceramic substrate. On the other hand, in the case of using the substrate of Sample No. 14 with a smaller amount of the fillers, the dielectric constant is halved, and in the cases of using the substrates of Sample Nos. 16 and 17 with too much of silicon oxide and boron oxide respectively, the dielectric constants are found reduced greatly. The decreases in the dielectric constants are considered to be caused by the reaction of the substrate's component with lead oxide in the thick film dielectric layer.

TABLE 1

| SAMPLE No. | GLASS COMPOSITION (% BY WEIGHT) | | | | | | | | | CONCENTRATION OF SUBSTRATE'S FILLER (% BY VOLUME) | | | AVERAGE COEFFICIENT OF LINEAR THERMAL EXPANSION (PPM) |
|---|---|---|---|---|---|---|---|---|---|---|---|---|---|
| | CaO | BrO | BeO | MgO | AEO | $SiO_2$ | $Al_2O_3$ | $TiO_2$ | $B_2O_3$ | $Al_2O_3$ | $MgSiO_4$ | YGZ | |
| 1 | 6 | 24 | 17 | — | 47 | 32 | 10 | 11 | — | 20 | — | — | 7.6 |
| 2 | 5 | 17 | 15 | — | 37 | 28 | 9 | 26 | — | — | 20 | — | 8.0 |
| 3 | 10 | 25 | 11 | — | 48 | 35 | 12 | 7 | — | 10 | 10 | — | 8.3 |
| 4 | 12 | 13 | 15 | — | 40 | 45 | 5 | 10 | — | 20 | — | — | 7.8 |
| 5 | 6 | 24 | 17 | — | 47 | 32 | 10 | 11 | — | 10 | — | — | 7.8 |
| 6 | 6 | 24 | 17 | — | 47 | 32 | 10 | 11 | — | 30 | — | — | 7.4 |
| 7 | 6 | 24 | 17 | — | 47 | 32 | 10 | 11 | — | — | — | 20 | 7.8 |
| 8 | 10 | 11 | 25 | — | 46 | 35 | 12 | 7 | — | 10 | 10 | — | 7.8 |
| 9 | — | 30 | 18 | — | 46 | 35 | 12 | 7 | — | 10 | 10 | — | 8.0 |
| 10 | 2 | 24 | 17 | 4 | 43 | 32 | 10 | 11 | — | 20 | — | — | 7.5 |
| 11 | 5 | 25 | 25 | — | 55 | 30 | 6 | 8 | — | 20 | — | — | 7.6 |
| 12 | 6 | — | 41 | — | 47 | 32 | 10 | 11 | — | 20 | — | — | 8.5 |
| 13 | 6 | 41 | — | — | 47 | 32 | 10 | 11 | — | 20 | — | — | 8.0 |
| 14 (COMPARISON) | 6 | 24 | 17 | — | 47 | 32 | 10 | 11 | — | 5* | — | — | 8.0 |
| 15 (COMPARISON) | 6 | 24 | 17 | — | 47 | 32 | 10 | 11 | — | 40* | — | — | 7.3 |
| 16 (COMPARISON) | 6 | 23 | 17 | — | 48 | 30 | 9 | 10 | 5* | 20 | — | — | 7.5 |
| 17 (COMPARISON) | 5 | 15 | 10 | — | 30 | 50* | 5 | 5 | — | 20 | — | — | 7.0 |
| 18 (COMPARISON) | 96% ALUMINA-OERAMICS | | | | | | | | | | | | 7.8 |

| SAMPLE No. | THREE POINT BENDING STRENGTH (Mpa) | PERCENTAGE OF MOISTURE CONTENT | HEAT RESISTANCE STRENGTH (° C.) | ∈ | DIELECTRIC'S REACTIVITY |
|---|---|---|---|---|---|
| 1 | 170 | 0 | 887 | 4070 | LOW |
| 2 | 173 | 0 | 885 | 4020 | LOW |
| 3 | 152 | 0 | 868 | 3970 | LOW |
| 4 | 194 | 0 | 822 | 4080 | LOW |
| 5 | 150 | 0 | 882 | 3880 | LOW |
| 6 | 190 | 0 | 875 | 4020 | LOW |
| 7 | 190 | 0 | 870 | 4110 | LOW |
| 8 | 170 | 0 | 870 | 4080 | LOW |
| 9 | 175 | 0 | 870 | 3870 | LOW |
| 10 | 170 | 0 | 885 | 3880 | LOW |
| 11 | 170 | 0 | 845 | 3760 | LOW |
| 12 | 180 | 0 | 840 | 3820 | LOW |
| 13 | 180 | 0 | 880 | 3900 | LOW |
| 14 (COMPARISON) | 150 | 0 | 880 | 1880 | MIDDLE |
| 15 (COMPARISON) | 210 | 0.5 | 880 | 4250 | LOW |
| 16 (COMPARISON) | 175 | 0 | 865 | 280 | HIGH |
| 17 (COMPARISON) | 160 | 0.5 | 840 | 1220 | HIGH |
| 18 (COMPARISON) | 300 | 0 | — | 4120 | LOW |

*OUT OF RANGE (Measurement Evaluation 4)

Table 2 shows weight decrease rates of a 96% alumina substrate having a plane size of 5 by 5 inches and a thickness of 1.0 mm and the substrate of Sample No. 1 in table 1 (with a thickness of 1 mm) as a typical example of the substrates of the present invention, in which the weight decrease by polishing is shown as a typical polishing characteristic. After both the substrates were polished for the same time using a usual lap polishing apparatus with WA 2000-grind-particles at a load of 1700 Pa, the rates of weight decrease due to the polishing were obtained.

TABLE 2

|  | INVENTION'S SUBSTRATE 5" × 5" × 1 mm | 96% ALUMINA SUBSTRATE 5" × 5" × 1 mm |
|---|---|---|
| INITIAL WEIGHT | 63.1 g | 60.7 g |
| POLISHING WEIGHT DECREASE | 13.0 g | 0.87 g |
| WEIGHT DECREASE RATE | 20.6% | 1.43% |
| CALCULATED POST-POLISHING THICKNESS (INITIAL THICKNESS × WEIGHT DECREASE RATE) | 206 μm | 14.3 μm |
| POST-POLISHING THICKNESS RATIO | 14.4 | 1 |

From Table 2, it is confirmed that the substrate of the present invention is one digit greater (faster) in the weight decrease rate (polishing speed) than the alumina ceramic substrate and very good in the polishing characteristic. Therefore, the substrate of the present invention can greatly reduce the cost of polishing compared with the conventional alumina substrate. Note that the same evaluation performed on the samples of the present invention except Sample No. 1 showed the great improvement over the alumina ceramic substrate in polishing speed.

(Measurement Evaluation 5)

Figure 3:
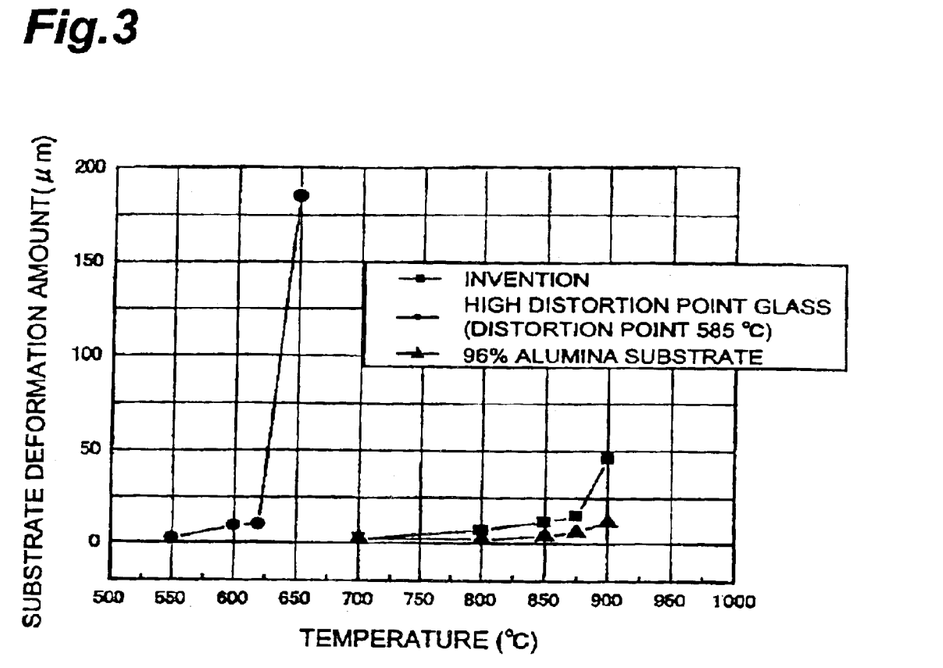
FIG. 3 is a graph showing a relationship between the substrate temperature and the substrate deformation amount in a high temperature load bending test.

FIG. 3 is a graph showing results of a high temperature load bending test, that is, the relationship between the substrate temperature and the substrate deformation amount in the high temperature load bending test. Used as sample pieces were pieces having a plane size of 10 by 120 mm and a thickness of 1 mm respectively cut out of the substrate of Sample No. 1 in table 1, the 96% alumina substrate, and commercially-available high distort ion-point glass for plasma displays (distortion-point of 585° C.).

After heat process at a predetermined temperature for 30 min. in an electric furnace with a load of 50 g applied to the center of these sample pieces supported at both ends thereof, the displacement at the center was measured to evaluate an anti-high-temperature-load-bending characteristic.

From FIG. 3, the substrate of the present invention shows an anti-high-temperature-load-bending characteristic equivalent to the alumina ceramic substrate good in heat resistance, and it is understood that the heat resistance strength shown in table 1 is achieved.

On the other hand, it is confirmed that the high distortion-point glass substrate produces great deformation at and above a temperature of near 650° C. Thus, it is found that the substrate of the present invention has a heat resistance of 200° C. or more greater than that of the high distortion-point glass substrate. Note that, if the same evaluation was performed on the samples of the present invention except Sample No. 1, it was confirmed that the anti-high-temperature-load-bending characteristic was excellent.

Embodiment Example 2

A thin film EL element was made having the equivalent structure to the one shown in FIG. 1 except that the insulator layer 43 is not provided First, commercially available Au paste was printed over the entire surface of each sample (as a substrate 2) made in Embodiment Example 1 for the thickness to be at 1 μm after sintering, and by sintering at a temperature of 800° C. by forming a pattern having multiple stripes of 800 μm in width and 200 μm in space by use of a photo-etching method, the lower electrode layer 3 was formed.

Next, coating the thick film dielectric paste and drying it by use of the screen printing were repeated for the thickness to be at 30 μm after sintering. This thick film dielectric paste is 4210C, product of ESL Corporation, and after the printing and drying, the thick film dielectric layer 41 was formed using a belt furnace at a temperature of 800° C. for 20 min. in an atmosphere where sufficient air is supplied thereto.

Next, the surface flattening layer 42 was formed by use of the solution coating sintering method. In the solution coating sintering, method, PZT was used as a precursor solution. By repeating coating this precursor solution over the thick film dielectric layer 41's surface by a spin coating method and sintering at a temperature of 700° C. for 15 min., the surface flattening layer 42 of 2 μm in film thickness was formed.

The precursor solution was made in the following procedure. First, 8.49 g of lead acetate trihydrate and 4.17 g of 1,3-propanediol were mixed, and heated and agitated for about two hours to obtain a transparent solution. Separately, 3.70 g of 1-propanol solution with 70% by weight of zirconium-n-propoxide and 1.58 g of acetylacetone were heated and agitated for 30 min., and 3.14 g of 2-propanol solution with 75% by weight of titanium-diisopropoxide-bisacetylacetonate and 2.32 g of 1,3-propanediol were added thereto, and heated and agitated further for two hours to make the solution This solution and the transparent solution were mixed at a temperature of 80° C., and heated and agitated for about two hours in a dry nitrogen atmosphere to make the brownish transparent solution. By keeping this solution at a temperature of 130° C., by-products were removed, and heated and agitated for three hours to obtain the precursor solution. The degree of viscosity of the precursor solution was adjusted by diluting it with n-propanol.

Next, the light emission layer 5 of 0.7 μm in thickness and made of ZnS:Mn was formed on the substrate heated to 200° C., using the vapor deposition method and a ZnS vapor deposition source with Mn doped., and then annealed in vacuum at 500° C. for 10 min.

Next, a $Si_3N_4$ thin film as the upper insulator layer 6 and an ITO thin film as the upper electrode layer 7 were formed subsequently by the sputtering method to obtain the thin film EL element sample. The upper electrode layer 7 was made into a stripes pattern where line electrodes of 1 mm in width are arranged by using a metal mask when forming the film.

In these samples, electrodes were led from the lower electrode layer 3 and the upper electrode layer 7 respectively, and an electric field at 1 kHz and of 50 μs in pulse width was applied thereto at such a magnitude that light emission brightness saturates.

As a result, with EL element samples made respectively from comparison sample. No. 18 (96% alumina ceramic substrate) and the present invention samples (Nos. 1 to 13) shown in table 1, good EL light emission was observed at an applied voltage of 140 to 150V and the saturated brightness was at about 7000 cd/m².

On the other hand, with EL element samples made from comparison sample Nos. 15 and 17 in table 1, dielectric breakdown occurred in the thick film dielectric layer 41 at an applied voltage of 100 to 150V before EL light emission started, and thereby brightness could not be measured. The reason for that is considered to be that, because the substrates 2 of comparison sample Nos. 15 and 17 are high in percentage of moisture content (porous) as shown in table 1, thickness-defects occurred in the thick film dielectric layer 41 formed thereon, thereby producing with low withstand voltage.

Moreover, with an EL element using a substrate 2 of comparison sample No. 16 in table 1, EL light emission was not observed even when the applied voltage is raised to 200 v. The reason for that is considered to be that the thick film dielectric layer 41 reacted with the substrate 2 to become low in dielectric constant, so that an effective voltage could not be applied to the light emission layer 5.

In addition, with an EL element using a substrate 2 of comparison sample No. 14 in table 1, the light emission threshold voltage is as high as 160 to 170V, the saturated brightness was as low as about 4000 cd/m$^2$, and some warp occurred in the substrate 2 when the thick film dielectric layer 41 was sintered, which is a problem in quality in making displays.

As described above, according to the present invention, displays having a large area and high in display quality that could not be accomplished with a ceramic substrate such as an alumina substrate and a conventional substrate such as a glass substrate can be produced easily at low cost.

What is claimed is:

1. A flat-panel-display substrate formed by sintering a mould comprising glass powder and a filler made of metal oxide and/or semi-metal oxide; the glass powder including alkaline-earth oxide; 15 to 50% by weight of silicon oxide; and no greater than 2% by weight of boron oxide; the filler being at a concentration of 10 to 30% by volume of the total amount of the glass powder and the filler in the mould; the mould's average coefficient of linear thermal expansion being from 7 to 9.5 ppm/° C. in a temperature range of 25 to 700° C.; and a sintered body obtained from the mould including crystal phases.

2. The flat-panel-display substrate according to claim 1, wherein the glass powder includes 35 to ~55% by weight of alkaline-earth oxide.

3. The flat-panel-display substrate according to claim 1, wherein the glass powder includes no greater than 1% by weight of alkali-metal oxide and no greater than 1% by weight of phosphorous oxide.

4. The flat-panel-display substrate according to claim 1, wherein the glass powder includes, as essential components, 25 to 50% by weight of silicon oxide; 5 to 15% by weight of aluminum oxide; and 5 to 30% by weight of titanium oxide and/or zirconium oxide; and as optional components, no greater than 45% by weight of barium oxide; no greater than 45% by weight of strontium oxide; no greater than 15% by weight of calcium oxide; and no greater than 15% by weight of magnesium oxide.

5. The flat-panel-display substrate according to claim 1, wherein the filler includes at least one of alumina, forsterite, and zirconia.

6. The flat-panel-display substrate according to claim 1, which is used for a thin film EL element or a plasma display panel.

7. A thin film EL element having a lower electrode layer; an insulator layer; a light emission layer; and an upper electrode layer formed on one side of the flat-panel-display substrate according to claim 1.

8. The flat-panel-display substrate according to claim 7, wherein the insulator layer includes lead and/or bismuth.

* * * * *